(12) United States Patent  
Tian

(10) Patent No.: US 10,166,758 B2  
(45) Date of Patent: Jan. 1, 2019

(54) ANILOX ROLL FOR FORMING ALIGNMENT FILM

(71) Applicants: BOE TECHNOLOGY GROUP CO., LTD., Beijing (CN); HEFEI BOE OPTOELECTRONICS TECHNOLOGY CO., LTD., Hefei (CN)

(72) Inventor: Wei Tian, Beijing (CN)

(73) Assignees: BOE TECHNOLOGY GROUP CO., LTD., Beijing (CN); HEFEI BOE OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 15/542,029

(22) PCT Filed: Jan. 5, 2017

(86) PCT No.: PCT/CN2017/070246  
§ 371 (c)(1),  
(2) Date: Jul. 6, 2017

(87) PCT Pub. No.: WO2017/206513  
PCT Pub. Date: Dec. 7, 2017

(65) Prior Publication Data  
US 2018/0215140 A1    Aug. 2, 2018

(30) Foreign Application Priority Data

May 31, 2016    (CN) .......................... 2016 1 0378053

(51) Int. Cl.  
*B41F 31/26*      (2006.01)  
*G02F 1/1337*    (2006.01)  
(Continued)

(52) U.S. Cl.  
CPC .............. *B41F 31/26* (2013.01); *B05D 1/002* (2013.01); *B29D 11/00326* (2013.01);  
(Continued)

(58) Field of Classification Search  
CPC ..... G02F 1/1337; G02F 1/1343; B41F 31/301  
(Continued)

(56) References Cited

U.S. PATENT DOCUMENTS 4,783,141 A  *  11/1988  Baba ........................ B29C 59/02  
                                                                 359/619  
5,233,921 A  *   8/1993  John ........................ B41F 31/26  
                                                                 101/352.13  
(Continued)

FOREIGN PATENT DOCUMENTS

| CN | 101925462 A | 12/2010 |
| CN | 103728778 A | 4/2014 |
| WO | 0010616 A2 | 3/2000 |

OTHER PUBLICATIONS

International Search Report & Written Opinion dated Apr. 12, 2017 regarding PCT/CN2017/070246.

*Primary Examiner* — Jason L Vaughan  
(74) *Attorney, Agent, or Firm* — Intellectual Valley Law, P.C.

(57) ABSTRACT

The present application discloses an anilox roll having a liquid carry capacity. The anilox roll includes a support; and a liquid transfer layer on an outer surface of the support, the liquid transfer layer having a plurality of liquid transfer cells for carrying a liquid. The liquid carrying capacity of the anilox roll is adjustable.

18 Claims, 7 Drawing Sheets

(51) Int. Cl.
  *B05D 1/00* (2006.01)
  *B41N 7/06* (2006.01)
  *B29D 11/00* (2006.01)
  *B41F 31/00* (2006.01)
  *G02F 1/13* (2006.01)

(52) U.S. Cl.
  CPC ............... *B41F 31/00* (2013.01); *B41N 7/06* (2013.01); *G02F 1/1337* (2013.01); *G02F 1/1303* (2013.01)

(58) Field of Classification Search
  USPC ........ 492/17, 18, 30, 48, 31, 32, 33, 34, 35, 492/36, 37
  See application file for complete search history.

(56) References Cited

U.S. PATENT DOCUMENTS

| | | | |
|---|---|---|---|
| 5,370,047 A | 12/1994 | Compton | |
| 5,495,800 A | 3/1996 | Weissbein et al. | |
| 6,082,257 A * | 7/2000 | Secor | B41F 13/32 101/137 |
| 6,092,465 A * | 7/2000 | Agronin | B41C 1/055 101/478 |
| 6,234,079 B1 * | 5/2001 | Chertkow | B41C 1/00 101/395 |
| 6,308,623 B1 * | 10/2001 | Schonberger | B41F 31/26 101/153 |
| 6,422,143 B1 * | 7/2002 | Lawrence | B41F 5/20 101/216 |
| 6,789,477 B2 * | 9/2004 | Rogge | B41F 5/24 101/153 |
| 7,707,937 B2 * | 5/2010 | Fork | B41C 1/00 101/395 |
| 7,762,188 B2 * | 7/2010 | Iftime | B41N 1/00 101/368 |
| 7,886,662 B2 * | 2/2011 | De Bruyker | B41M 1/04 101/153 |
| 7,951,319 B2 * | 5/2011 | Sherman | B29C 37/0053 264/293 |
| 7,987,784 B2 * | 8/2011 | Daniel | B41C 1/00 101/395 |
| 8,055,165 B2 * | 11/2011 | Mestha | G03G 15/0818 399/252 |
| 8,055,166 B2 * | 11/2011 | Mestha | G03G 15/0818 399/252 |
| 9,504,164 B2 * | 11/2016 | Ramakrishnan | B41F 5/24 |
| 9,933,663 B2 * | 4/2018 | Jing | G02F 1/1337 |
| 2003/0024425 A1 * | 2/2003 | Naniwa | B41F 7/36 101/350.1 |
| 2007/0101883 A1 * | 5/2007 | Rene | B41M 1/00 101/375 |
| 2008/0141886 A1 * | 6/2008 | Whitelaw | B41F 13/14 101/484 |
| 2010/0011978 A1 * | 1/2010 | Whitelaw | B41F 13/24 101/130 |
| 2010/0018419 A1 * | 1/2010 | Whitelaw | B41F 5/18 101/248 |
| 2011/0067590 A1 * | 3/2011 | Chow | G03G 15/104 101/335 |
| 2011/0185928 A1 | 8/2011 | Hendriks | |
| 2011/0249047 A1 * | 10/2011 | De Joseph | B41M 1/06 347/2 |
| 2012/0048133 A1 * | 3/2012 | Burberry | B41N 1/12 101/395 |
| 2012/0048135 A1 * | 3/2012 | Burberry | B41C 1/05 101/483 |
| 2012/0186472 A1 * | 7/2012 | Burberry | B41C 1/05 101/401.1 |
| 2012/0187603 A1 * | 7/2012 | Burberry | B41C 1/05 264/400 |
| 2012/0211924 A1 * | 8/2012 | Tutt | B41C 1/05 264/400 |
| 2012/0212563 A1 * | 8/2012 | Tutt | B41C 1/05 347/225 |

* cited by examiner

ANILOX ROLL FOR FORMING ALIGNMENT FILM

CROSS-REFERENCE TO RELATED APPLICATION

This application is a national stage application under 35 U.S.C. § 371 of International Application No. PCT/CN2017/070246 filed Jan. 5, 2017, which claims priority to Chinese Patent Application No. 201610378053.6, filed May 31, 2016, the contents of which are incorporated by reference in the entirety.

TECHNICAL FIELD

The present invention relates to display technology, more particularly, to an anilox roll and a printing method using the anilox roll.

BACKGROUND

In a liquid crystal display panel, an alignment film is applied to one or both of an array substrate and a counter substrate. A plurality of microgrooves for inducing liquid crystal molecules to align in a certain direction can be formed by rubbing a surface of the alignment film in a fixed direction. Patterns having a large height difference on the display substrate may interfere with the rubbing process. For example, the alignment layer proximal to the patterns having a large height difference may not be sufficiently rubbed, resulting in light leakage in the area, e.g., sand mura. Moreover, various liquid crystal display panels have different requirements on the thickness of the alignment film. An ultra-thin alignment film is prone to physical damages during the rubbing process. Thus, the thickness and evenness of the alignment film on the display substrate greatly affect display quality.

SUMMARY

In one aspect, the present invention provides an anilox roll having a liquid carry capacity, comprising a support; and a liquid transfer layer on an outer surface of the support, the liquid transfer layer comprising a plurality of liquid transfer cells for carrying a liquid; wherein the liquid carrying capacity of the anilox roll is adjustable.

Optionally, an area of the outer surface of the support is adjustable; the area of the outer surface being correlated to the liquid carrying capacity of the anilox roll.

Optionally, an area of a contacting surface between the support and the liquid transfer layer is adjustable; the area of the contacting surface being correlated to the liquid carrying capacity of the anilox roll.

Optionally, the support has a substantially cylindrical shape, and a diameter of the support is adjustable; the diameter of the support being correlated to the liquid carrying capacity of the anilox roll.

Optionally, the liquid transfer layer has a substantially arcuate shape, and a diameter of the liquid transfer layer is adjustable; the diameter of the liquid transfer layer being correlated to the liquid carrying capacity of the anilox roll.

Optionally, a liquid carrying capacity of each of the plurality of liquid transfer cells is adjustable.

Optionally, the support comprises an inner roller; an outer roller mounted surrounding the outer roller; and a plurality of spacer posts for mounting the outer roller to the inner roller, and configured to adjust a spacing between the inner roller and the outer roller, thereby adjusting the area of the outer surface of the support wherein each of the plurality of spacer posts having one terminal coupled to the inner roller and another terminal coupled to the outer roller.

Optionally, a length of each of the plurality of spacer posts is adjustable, thereby adjusting the spacing between the inner roller and the outer roller.

Optionally, each of the plurality of spacer posts comprises a first section and a second section coupled to each other and configured to be adjustably movable relative to each other; a first terminal of the first section is coupled to the outer roller, a first terminal of the second section is coupled to the inner roller; and a second terminal of the first section and a second terminal of the second portion are adjustably movably attached to each other.

Optionally, the first terminal of the first section is movably attached to the outer roller.

Optionally, the first terminal of the second section is movably attached to the inner roller.

Optionally, the second terminal of the first section and the second terminal of the second section form a shell-shaft structure comprising a central shaft coupled with a shell surrounding the central shaft; and the central shaft is configured to move relative to the shell between an extended position and a retracted position.

Optionally, the relative movement between the central shaft and the shell is pneumatically or hydraulically controlled.

Optionally, the relative movement between the central shaft and the shell is threadedly driven.

Optionally, at least one of the plurality of spacer posts are a plurality of auxiliary spacer posts; the outer roller comprises a plurality of mounting recesses for mounting the plurality of auxiliary spacer posts in the plurality of mounting recesses respectively; the first terminal of the first section of each of the plurality of auxiliary spacer posts is configured to be adjustably coupled to the outer roller, and a protruding end of the first terminal of the first section of each of the plurality of auxiliary spacer posts is configured to extends into one of the plurality of the mounting recesses in the outer roller.

Optionally, a second terminal of the first section and a second terminal of the second section of each of the plurality of auxiliary spacer posts form a shell-shaft structure comprising a central shaft coupled with a shell surrounding the central shaft; and the central shaft is configured to move relative to the shell between an extended position and a retracted position.

Optionally, the relative movement between the central shaft and the shell is spring-driven.

Optionally, the outer roller has a laminated multi-layered structure comprising a plurality of sub-layers, at least two of the plurality of sub-layers are slidably movable relative to each other.

Optionally, the liquid transfer layer is a flexible layer.

Optionally, the liquid transfer layer is made of a resin material or a rubber material.

Optionally, the anilox roll further comprises a substrate layer on a side of the liquid transfer layer proximal to the outer roller.

Optionally, the substrate layer is made of a resin material.

Optionally, the plurality of liquid transfer cells are evenly distributed over the liquid transfer layer.

Optionally, a cross-section of one of the plurality of liquid transfer cells has a circular shape, an elliptical shape, a triangular shape, a trapezoidal shape, or a fan shape.

Optionally, the inner roller comprises a driver roller and an idler roller surrounding the driver roller and each of the plurality of spacer posts having one terminal connected to the idler roller.

In another aspect, the present invention provides a support for assembling an anilox roll, comprising an inner roller; an outer roller mounted surrounding the outer roller; and a plurality of spacer posts for mounting the outer roller to the inner roller, and configured to adjust a spacing between the inner roller and the outer roller, thereby adjusting the area of the outer surface of the support; wherein each of the plurality of spacer posts having one terminal coupled to the inner roller and another terminal coupled to the outer roller.

In another aspect, the present invention provides a printing method for coating an alignment solution on a substrate, comprising coating the alignment solution on the substrate using an anilox roll described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional anilox rolls, the surface of the anilox rolls are made of a ceramic material. Liquid transfer cells (dimples) of the conventional anilox rolls are formed in the ceramic layer, which is coated directly onto a metal roller and cannot be removed from the metal roller. When the user wants to make an alignment film having a different thickness, it is required to replace the entire anilox roll with one having a matching liquid carrying capacity. The process is cumbersome and time consuming. When the anilox roll is replaced, the new anilox roll has to be calibrated and fin-tuned for precision, resulting in a lower manufacturing efficiency and higher manufacturing costs.

Accordingly, the present invention provides, inter alia, an anilox roll and a printing method using the anilox roll that substantially obviate one or more of the problems due to limitations and disadvantages of the related art. In one aspect, the present disclosure provides an anilox roll. In some embodiments, the anilox roll includes a support and a liquid transfer layer on an outer surface of the support, the liquid transfer layer having a plurality of liquid transfer cells for carrying a liquid. Optionally, the liquid carrying capacity of the anilox roll is adjustable.

Figure 1:
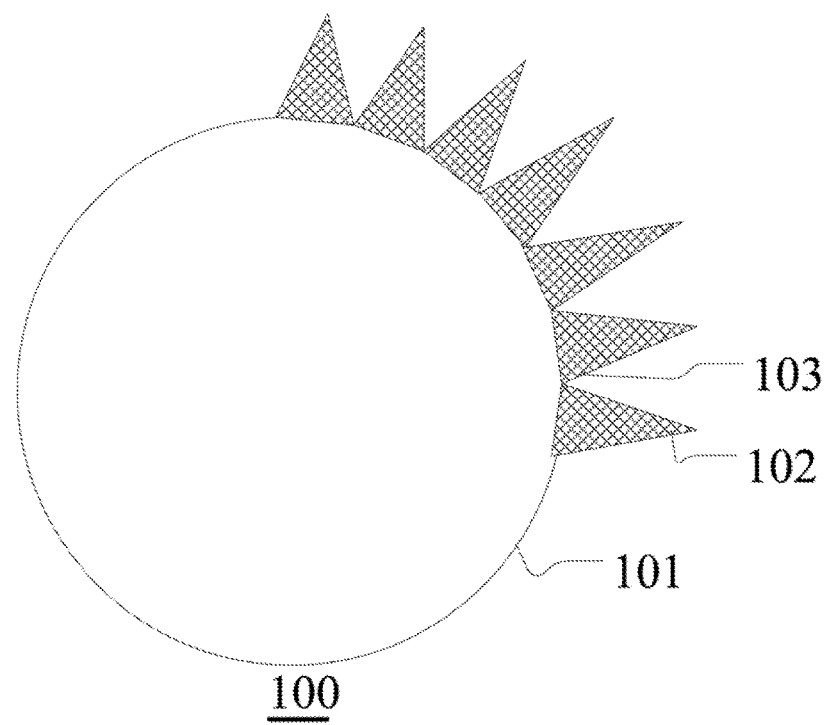
FIG. 1 is a cross-sectional view of an anilox roll in some embodiments of the present disclosure.

FIG. 1 is a cross-sectional view of an anilox roll in some embodiments of the present disclosure. Referring to FIG. 1, the anilox roll in some embodiments includes a support 101 and a liquid transfer layer 102 on the outer surface of the support 101. The liquid transfer layer 102 includes a plurality of liquid transfer cells 103 for containing a liquid. The liquid transfer layer 102 covers at least a portion of the periphery of the support 101. Optionally, the liquid transfer layer 102 covers the entire periphery of the support 101.

The support 101 may have various appropriate shapes. Optionally, the support 101 has a shape selected from a group including a cylindrical shape, a semi-cylindrical shape, a quadrant cylindrical shape, and the like. Optionally, the support 101 has a cylindrical shape.

The liquid transfer layer 102 may have various appropriate shapes. Optionally, the liquid transfer layer 102 has a shape complementary to that of the support 101. In some embodiments, the liquid transfer layer 102 has an arcuate shape. Optionally, the liquid transfer layer 102 has a shape selected from a group including a hollow cylindrical shape, a hollow semi-cylindrical shape, a hollow quadrant cylindrical shape, and the like. Optionally, the liquid transfer layer 102 has a hollow cylindrical shape. The liquid transfer layer 102 surrounds the outer surface of the support 101. As used herein, the term "arcuate" refers to a hollow cylindrical or partial hollow cylindrical shape.

In the present anilox roll, the liquid carrying capacity of the anilox roll is adjustable. For example, the maximum volume of the liquid that can be loaded in the liquid transfer layer 102 is adjustable. Optionally, the liquid carrying capacity of each of the plurality of liquid transfer cells 103 is adjustable. In one example, the total volume of the plurality of liquid transfer cells 103 is adjustable. In another example, the volume of each of the plurality of liquid transfer cells 103 is adjustable.

In some embodiments, the area of the outer surface of the support 101 is adjustable, and the area of the outer surface is correlated to the liquid carrying capacity of the anilox roll. Optionally, the area of the outer surface is positively correlated to the liquid carrying capacity of the anilox roll. Optionally, the area of the outer surface is correlated to the total volume of the plurality of liquid transfer cells 103. Optionally, the area of the outer surface is correlated to the volume of each of the plurality of liquid transfer cells 103. In one example, the area of the outer surface of the support 101 is adjusted to an increased value, correspondingly the total volume of the plurality of liquid transfer cells 103 (optionally, the volume of each of the plurality of liquid transfer cells 103) is increased, resulting in an increased liquid carrying capacity of the anilox roll.

In some embodiments, the area of a contacting surface between the support 101 and the liquid transfer layer 102 is adjustable, and the area of the contacting surface is correlated to the liquid carrying capacity of the anilox roll. Optionally, the area of the contacting surface is positively correlated to the liquid carrying capacity of the anilox roll. Optionally, the area of the contacting surface is correlated to the total volume of the plurality of liquid transfer cells 103. Optionally, the area of the contacting surface is correlated to the volume of each of the plurality of liquid transfer cells 103. In one example, the area of the contacting surface is adjusted to an increased value, correspondingly the total volume of the plurality of liquid transfer cells 103 (optionally, the volume of each of the plurality of liquid transfer cells 103) is increased, resulting in an increased liquid carrying capacity of the anilox roll.

In some embodiments, the support 101 has a substantially cylindrical shape, the diameter of the support 101 is adjustable, and the diameter of the support 101 is correlated to the liquid carrying capacity of the anilox roll. Optionally, the diameter of the support 101 is positively correlated to the liquid carrying capacity of the anilox roll. Optionally, the diameter of the support 101 is correlated to the total volume of the plurality of liquid transfer cells 103. Optionally, the diameter of the support 101 is correlated to the volume of each of the plurality of liquid transfer cells 103. In one example, the diameter of the support 101 is adjusted to an increased value, correspondingly the outer surface of the support 101 is increased, and the total volume of the plurality of liquid transfer cells 103 (optionally, the volume of each of the plurality of liquid transfer cells 103) is increased, resulting in an increased liquid carrying capacity of the anilox roll.

In some embodiments, the liquid transfer layer 102 has an arcuate shape (e.g., a substantially hollow cylindrical shape), the diameter of the liquid transfer layer 102 is adjustable, and the diameter of the liquid transfer layer 102 is correlated to the liquid carrying capacity of the anilox roll. Optionally, the diameter of the liquid transfer layer 102 is positively correlated to the liquid carrying capacity of the anilox roll. Optionally, the diameter of the liquid transfer layer 102 is correlated to the total volume of the plurality of liquid transfer cells 103. Optionally, the diameter of the liquid transfer layer 102 is correlated to the volume of each of the plurality of liquid transfer cells 103. In one example, the diameter of the liquid transfer layer 102 is adjusted to an increased value, correspondingly the total volume of the plurality of liquid transfer cells 103 (optionally, the volume of each of the plurality of liquid transfer cells 103) is increased, resulting in an increased liquid carrying capacity of the anilox roll.

In some embodiments, the plurality of liquid transfer cells are a plurality of recesses (e.g., dimples). The liquid to be transferred is first contained in the plurality of recesses. The recesses may have various appropriate shapes and dimensions. Examples of shapes of the perimeter of the recess include, but are not limited to, circular, triangular, obround, diamond, and deltoid. Examples of recess shapes include, but are not limited to, tetrahedron, cuboid, prism, pyramid, pyramid frustum, obelisk, wedge, spherical segment, ellipsoid segment, catenoid, paraboloid, cylinder, cone, disk or combination of such shapes. The liquid transfer cells may be used to transfer various types of liquids, e.g., ink, coating solutions. In one example, the anilox roll is used to apply an alignment film solution (e.g., a polyimide solution) to a liquid crystal display substrate.

Accordingly, in some embodiments, the liquid transfer cell 103 is capable of having a retracted configuration in which the volume of the liquid transfer cell 103 is decreased and an expanded configuration in which the volume of the liquid transfer cell 103 is increased. In some embodiments, the retracted configuration of the liquid transfer cell 103 corresponds to a retracted configuration of the support 101, and the expanded configuration of the liquid transfer cell 103 corresponds to an expanded configuration of the support 101. The retracted and expanded configurations of the support 101 may be achieved by adjusted a diameter of the support 101. Optionally, the retracted configuration of the liquid transfer cell 103 corresponds to a retracted configuration of the liquid transfer layer 102, and the expanded configuration of the liquid transfer cell 103 corresponds to an expanded configuration of the liquid transfer layer 102.

Optionally, the liquid transfer layer 102 is an integral layer. Optionally, the liquid transfer layer 102 are assembled together from multiple portions.

Figure 2:
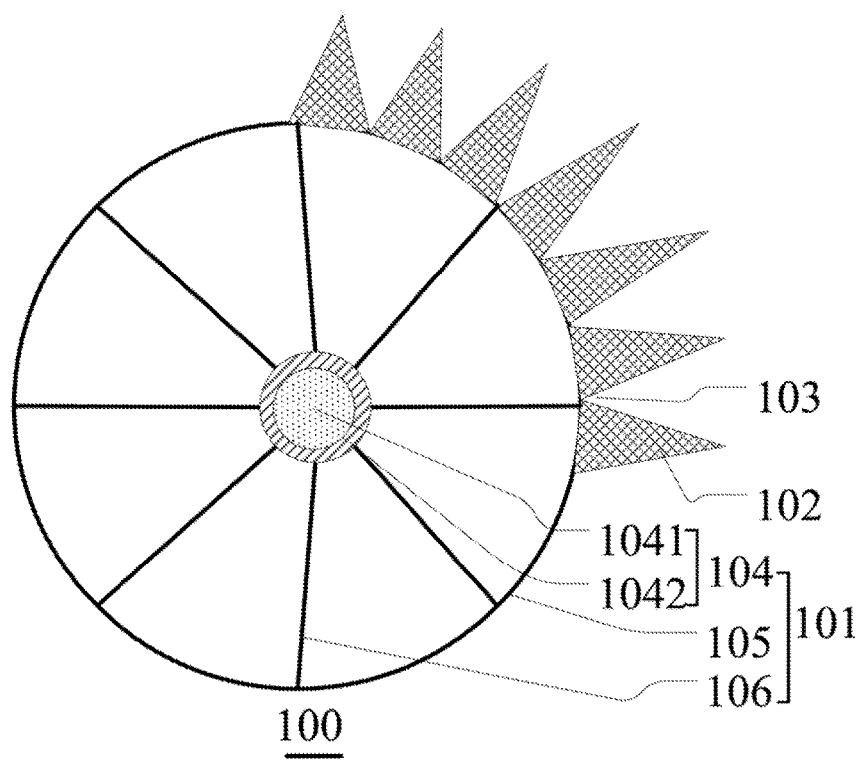
FIG. 2 is a cross-sectional view of an anilox roll in some embodiments of the present disclosure.

FIG. 2 is a cross-sectional view of an anilox roll in some embodiments of the present disclosure. Referring to FIG. 2, the support 101 in some embodiments includes an inner roller 104; an outer roller 105 mounted surrounding the inner roller 104; and a plurality of spacer posts 106 for mounting the outer roller to the inner roller, and configured to adjust a spacing between the inner roller 104 and the outer roller 105, thereby adjusting the area of the outer surface of the support 101. Each of the plurality of spacer posts 106 has one terminal coupled to the inner roller 104 and another terminal coupled to the outer roller 105. By adjusting the spacing between the inner roller 104 and the outer roller 105, several parameters of the anilox roll may be adjusted, for example, the area of the outer surface of the support 101, the area of the outer surface of the liquid transfer layer 102, the diameter of the support 101, the diameter of the liquid transfer layer 102, the area of the contacting surface between the support 101 and the liquid transfer layer 102, and the volume of the liquid transfer cell 103. In one example, the inner roller 104 and the outer roller 105 have a first spacing corresponding to the retracted configuration of the liquid transfer cell 103 and a second spacing corresponding to the expanded configuration of the liquid transfer cell 103.

In some embodiments, the spacing between the inner roller 104 and the outer roller 105 is adjusted by adjusting the length of the spacer post 106. For example, the spacer post 106 may have a first length and a second length greater than the first length. In one example, the first length of the spacer post 106 corresponds to the first spacing between the inner roller 104 and the outer roller 105, which in turn corresponds to the retracted configuration of the liquid transfer cell 103 and the retracted configuration of the support 101. In another example, the second length of the spacer post 106 corresponds to the second spacing between the inner roller 104 and the outer roller 105, which in turn corresponds to the expanded configuration of the liquid transfer cell 103 and the expanded configuration of the support 101. Optionally, the diameter of the support 101 is adjusted by adjusting the length of the spacer post 106, the diameter of the support 101 is positively correlated to the length of the spacer post 106.

In some embodiments, the spacing between the inner roller 104 and the outer roller 105 is adjusted by adjusting an included angle between the spacer post 106 and the outer roller 105 (or the inner roller 104) while the length of the spacer post 106 remains the same. For example, the spacer post 106 and the outer roller 105 (or the inner roller 104) may have a first included angle and a second included angle greater than the first included angle. In one example, the first included angle of the spacer post 106 corresponds to the first spacing between the inner roller 104 and the outer roller 105, which in turn corresponds to the retracted configuration of the liquid transfer cell 103 and the retracted configuration of the support 101. In another example, the second included angle of the spacer post 106 corresponds to the second spacing between the inner roller 104 and the outer roller 105, which in turn corresponds to the expanded configuration of the liquid transfer cell 103 and the expanded configuration of the support 101. Optionally, the diameter of the support 101 is adjusted by adjusting the included angle between the spacer post 106 and the outer roller 105 (or the inner roller 104), the diameter of the support 101 is positively correlated to the included angle.

In some embodiments, the spacing between the inner roller 104 and the outer roller 105 is adjusted by adjusting both the length of the spacer post 106 and the included angle between the spacer post 106 and the outer roller 105 (or the inner roller 104). For example, the spacer post 106 may have a first state having a smaller length or a smaller included angle, and a second state having a greater length or a greater included angle. In one example, the spacer post 106 has a first state (e.g., a smaller length or a smaller included angle or both) corresponding to the first spacing between the inner roller 104 and the outer roller 105, which in turn corresponds to the retracted configuration of the liquid transfer cell 103 and the retracted configuration of the support 101. In another example, the spacer post 106 has a second state (e.g., a greater length or a greater included angle or both) corresponding to the second spacing between the inner roller 104 and the outer roller 105, which in turn corresponds to the expanded configuration of the liquid transfer cell 103 and the expanded configuration of the support 101.

Numerous alternative embodiments may be practiced to adjust the spacing between the inner roller 104 and the outer roller 105. For example, the spacer post 106 may include a first section and a second section, the first section and the second section forming an included angle. In some embodiments, the spacing between the inner roller 104 and the outer roller 105 may be adjusted by adjusting the included angle between the first section and the second section. For example, the first section and the second section of the spacer post 106 may have a first included angle and a second included angle greater than the first included angle. In one example, the first included angle between the first section and the second section corresponds to the first spacing between the inner roller 104 and the outer roller 105, which in turn corresponds to the retracted configuration of the liquid transfer cell 103 and the retracted configuration of the support 101. In another example, the second included angle between the first section and the second section corresponds to the second spacing between the inner roller 104 and the outer roller 105, which in turn corresponds to the expanded configuration of the liquid transfer cell 103 and the expanded configuration of the support 101. Optionally, the diameter of the support 101 is adjusted by adjusting the included angle between the first section and the second section, the diameter of the support 101 is positively correlated to the included angle.

Referring to FIG. 2, the inner roller 104 in some embodiments includes a driver roller 1041 and an idler roller 1042 surrounding the driver roller 1041. Optionally, each of the plurality of spacer posts 106 has a terminal connected to the idler roller 1042.

The idler roller 1042 may be configured to rotate together with the driver roller 1041, e.g., driven by the driver roller 1041. Optionally, the idler roller 1042 is configured to rotate relative to the driver roller 1041. The driver roller 1041 can be keep still, and the idler roller 1042 rotates relative to the driver roller 1041 clockwise or counter-clockwise.

In one example, the driver roller 1041 is driven by a motor, and the idler roller 1042 is in turn driven to rotate by the driver roller 1041. When the spacer post 106 transforms from a first configuration having a smaller length to a second configuration having a greater length, the diameter of the support 101 is increased. When the spacer post 106 transforms from a second configuration having a greater length to a first configuration having a smaller length, the diameter of the support 101 is decreased. Accordingly, the spacing between the inner roller 104 and the outer roller 105 may be adjusted by adjusting the length of the spacer post 106.

Figure 3:
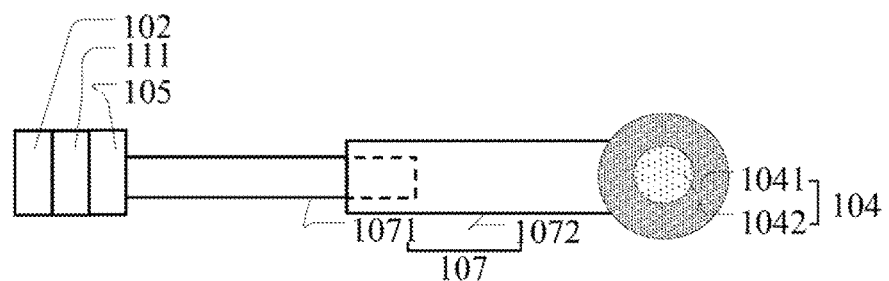
FIG. 3 is a schematic diagram illustrating the structure of a primary spacer post in some embodiments of the present disclosure.

In some embodiments, the plurality of spacer posts 106 include a plurality of primary spacer posts. FIG. 3 is a schematic diagram illustrating the structure of a primary spacer post in some embodiments of the present disclosure. Referring to FIG. 3, the primary spacer post 107 includes a first section 1071 and a second section 1072 coupled to each other and configured to be adjustably movable relative to each other. The first terminal of the first section 1071 is coupled to the outer roller 105, the first terminal of the second section 1072 is coupled to the inner roller 104. The second terminal of the first section 1071 and the second terminal of the second portion 1072 are adjustably movably attached to each other.

Referring to FIG. 3, in some embodiments, the second terminal of the first section 1071 and the second terminal of the second section 1072 form a shell-shaft structure having a central shaft coupled with a shell surrounding the central shaft. The central shaft is configured to move relative to the shell between an extended position and a retracted position. For example, as shown in FIG. 3, the second terminal of the first section 1071 constitutes the central shaft, the second terminal of the second section 1072 constitutes the shell surrounding the central shaft. Optionally, the second terminal of the second section 1072 may be the central shaft, and the second terminal of the first section 1071 may be the shell surrounding the central shaft. The central shaft is configured to move relative to the shell between an extended position and a retracted position, thereby adjusting the length of the primary spacer post 107, the diameter of the support, and the spacing between the inner roller and the outer roller.

Optionally, the first terminal of the first section 1071 is securely attached to the outer roller. Optionally, the first terminal of the second section 1072 is securely attached to the inner roller. Optionally, the first terminal of the first section 1071 is movably attached to the outer roller. For example, the first section 1071 is capable of rotating relative to its axis along a longitudinal direction while attached to the inner roller. Optionally, the first terminal of the second section 1072 is movably attached to the inner roller. For example, the second section 1072 is capable of rotating relative to its axis along a longitudinal direction while attached to the inner roller.

The relative movement between the central shaft and the shell may be driven by various methods. Optionally, the relative movement between the central shaft and the shell is pneumatically driven. Optionally, the relative movement between the central shaft and the shell is hydraulically driven. In one example, the second section 1072 includes a pneumatical or hydraulic passage, the second terminal of the first section 1071 is surrounded by the second terminal of the second section 1072. Driven by the propulsion generated from the pneumatical or hydraulic passage, the second terminal of the first section 1071 moves relative to the second terminal of the second section 1072.

Figure 4:
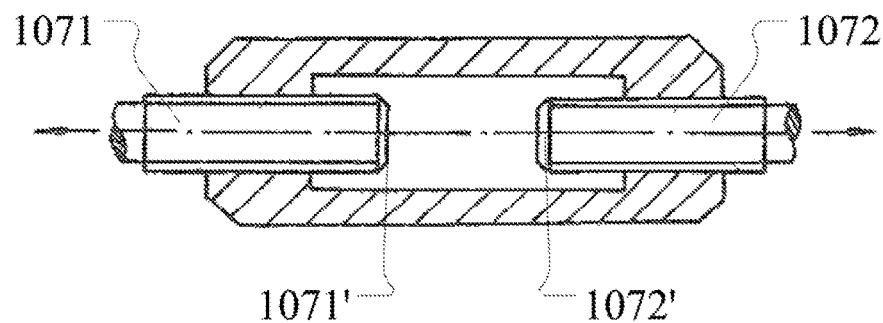
FIG. 4 is a schematic diagram illustrating a threaded structure for connecting a first section and a second section of a spacer post in some embodiments of the present disclosure.

In some embodiments, the relative movement between the central shaft and the shell is threadedly driven. Optionally, the second terminal of the first section 1071 and the second terminal of the second section 1072 are spaced apart by a certain distance, allowing them to move relative to each other. Optionally, the second terminal of the first section 1071 is surrounded by the second terminal of the second section 1072, allowing them to move relative to each other. Optionally, the second terminal of the second section 1072 is surrounded by the second terminal of the first section 1071, allowing them to move relative to each other. FIG. 4 is a schematic diagram illustrating a threaded structure for connecting a first section and a second section of a spacer post in some embodiments of the present disclosure. Referring to FIG. 4, the threaded structure in some embodiments is a two-screw structure, in which one of the screw is the second terminal 1071' of the first section 1071 and the other screw is the second terminal 1072' of the second section 1072. The threaded structure includes two oppositely threaded sections, respectively corresponding to the second terminal 1071' of the first section 1071 (the first screw) and the second terminal 1072' of the second section 1072 (the second screw). The thread pitches for the two oppositely threaded sections may be the same. Optionally, the thread pitches for the two oppositely threaded sections are different. When the first screw and the second screw are rotated, the screws (e.g., the second terminal 1071' of the first section 1071 and the second terminal 1072' of the second section 1072) move simultaneously either away from each other or closer to each other, depending on the direction the screws are rotated. In one example, the second terminal 1071' of the first section 1071 and the second terminal 1072' of the second section 1072 are oppositely threaded, e.g., one has a left-hand thread and the other has a right-hand thread, the second terminal 1071' of the first section 1071 and the second terminal 1072' of the second section 1072 are coupled together through a nut. In one example, when the nut is rotated, the second terminal 1071' of the first section 1071 and the second terminal 1072' of the second section 1072 are move simultaneously either away from each other or closer to each other, depending on the direction the nut is rotated.

Optionally, the relative movement between the central shaft and the shell is spring-driven.

In some embodiments, the primary spacer post 107 is the direct driving force for adjusting the diameter of the support and the spacing between the inner roller and the outer roller. Optionally, by adjusting the length of the primary spacer post 107, the several parameters of the anilox roll may be adjusted, including the area of the outer surface of the support, the area of the outer surface of the liquid transfer layer, the diameter of the support, the diameter of the liquid transfer layer, the area of the contacting surface between the support and the liquid transfer layer, the spacing between the inner roller and the outer roller, the volume of the liquid transfer cell, and the liquid carrying capacity of the anilox roll.

Figure 5:
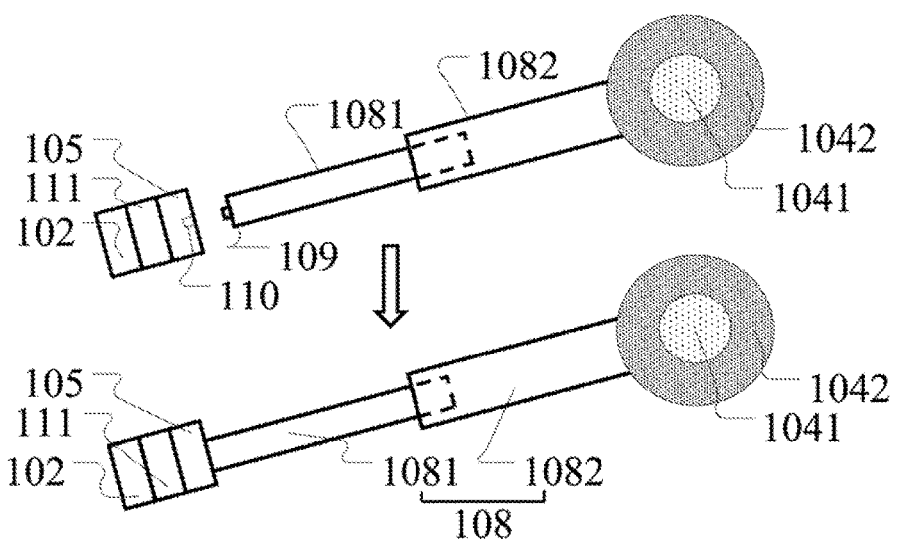
FIG. 5 is a schematic diagram illustrating the structure of an auxiliary spacer post in some embodiments of the present disclosure.

In some embodiments, the plurality of spacer posts include a plurality of auxiliary spacer posts. FIG. 5 is a schematic diagram illustrating the structure of an auxiliary spacer post in some embodiments of the present disclosure. Referring to FIG. 5, the auxiliary spacer post 108 in some embodiments includes a third section 1081 and a fourth section 1082 coupled to each other and configured to be adjustably movable relative to each other. The first terminal of the third section 1081 is coupled to the outer roller 105, the first terminal of the fourth section 1082 is coupled to the inner roller 104. The second terminal of the third section 1081 and the second terminal of the fourth portion 1082 are adjustably movably attached to each other.

In some embodiments, the auxiliary spacer post 108 is movably mounted on the outer roller. As shown in FIG. 5, the first terminal of the third section 1081 of the auxiliary spacer post 108 has a protruding end 109, the outer roller 105 has a corresponding recess 110 complementary to the protruding end 109. The protruding end 109 is configured to be mounted in the corresponding recess 110. Optionally, the protruding end 109 is movably mounted in the corresponding recess 110, e.g., the third section 1081 is capable of rotating relative to its axis along a longitudinal direction while mounted in the corresponding recess 110 of the outer roller 105. Optionally, the protruding end 109 is securely mounted in the corresponding recess 110. Optionally, the first terminal of the fourth section 1082 is securely attached to the inner roller. Optionally, the first terminal of the fourth section 1082 is movably attached to the inner roller. For example, the fourth section 1082 is capable of rotating relative to its axis along a longitudinal direction while attached to the inner roller.

Figure 6:
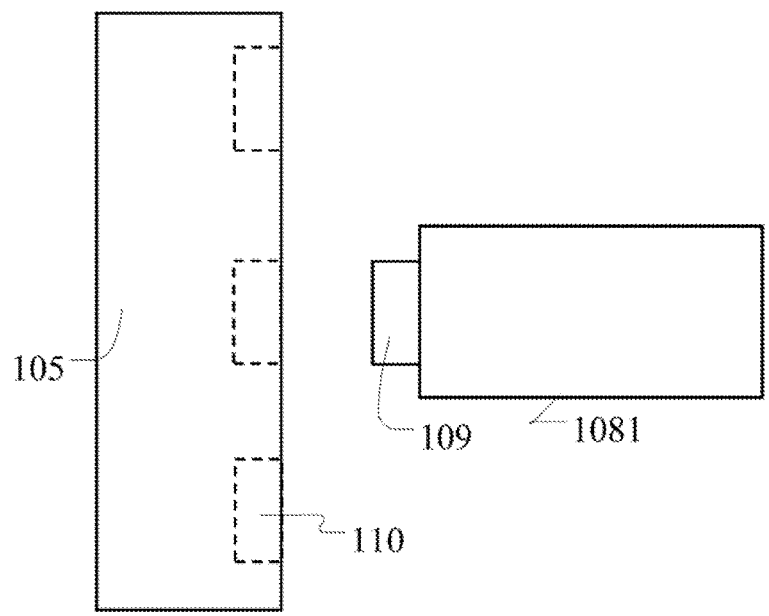
FIG. 6 is a schematic diagram illustrating an engagement of a protruding end of an auxiliary spacer post and a mounting recess in an outer roller in some embodiments of the present disclosure.

FIG. 6 is a schematic diagram illustrating an engagement of a protruding end of an auxiliary spacer post and a mounting recess in an outer roller in some embodiments of the present disclosure. Referring to FIG. 6, the outer roller 105 includes a plurality of mounting recesses 110 (e.g., mounting cavities) for mounting the plurality of auxiliary spacer posts 108 in the plurality of mounting recesses 110 respectively. The first terminal of the first section of each of the plurality of auxiliary spacer posts is configured to be adjustably coupled to the outer roller 105. A protruding end 109 of the first terminal of the third section 1081 of each of the plurality of auxiliary spacer posts is configured to extends into one of the plurality of the mounting recesses 110 in the outer roller 105. Optionally, the plurality of mounting recesses 110 are arranged in the outer roller 105 according to a certain pattern. Depending on the retracted or expanded configuration of the support, the protruding end 109 of the first terminal of the third section 1081 can extend into one of the plurality of the mounting recesses 110 in the outer roller 105. For example, when the protruding end 109 is mounted into the mounting recess 110 in the middle position, the support may be in a retracted configuration having a smaller diameter. When the protruding end 109 is mounted into the other two mounting recesses 110 in FIG. 6, the support may be in an expanded configuration having a greater diameter. The plurality of auxiliary spacer posts 108 coordinate with the plurality of primary spacer posts, mounting the outer roller 105 surrounding the inner roller. In one example, the inner roller has a cylindrical shape, and the outer roller 105 is also maintained in a cylindrical shape by the plurality of primary spacer posts and the plurality of auxiliary spacer posts 108.

Referring to FIGS. 5 and 6, in some embodiments, the second terminal of the third section 1081 and the second terminal of the fourth section 1082 form a shell-shaft structure having a central shaft coupled with a shell surrounding the central shaft. The central shaft is configured to move relative to the shell between an extended position and a retracted position. For example, as shown in FIG. 5, the second terminal of the third section 1081 constitutes the central shaft, the second terminal of the fourth section 1082 constitutes the shell surrounding the central shaft. Optionally, the second terminal of the fourth section 1082 may be the central shaft, and the second terminal of the third section 1081 may be the shell surrounding the central shaft. The central shaft is configured to move relative to the shell between an extended position and a retracted position, thereby adjusting the length of the auxiliary spacer posts 108.

The relative movement between the central shaft and the shell may be driven by various methods. Optionally, the relative movement between the central shaft and the shell is pneumatically driven. Optionally, the relative movement between the central shaft and the shell is hydraulically driven. In one example, the fourth section 1082 includes a pneumatical or hydraulical passage, the second terminal of the third section 1081 is surrounded by the second terminal of the fourth section 1082. Driven by the propulsion generated from the pneumatical or hydraulical passage, the second terminal of the third section 1081 moves relative to the second terminal of the fourth section 1082.

Optionally, the relative movement between the central shaft and the shell is spring-driven. For example, the relative distance between the third section 1081 and the fourth section 1082 in the auxiliary spacer post 108 can be changed by adjusting the amplitude of elastic transformation of a spring disposed between the third section 1081 and the fourth section 1082. In one example, the second terminal of the third section 1081 and the second terminal of the fourth section 1082 form a shell-shaft structure having a central shaft coupled with a shell surrounding the central shaft, and a compressed spring between the central shaft and the shell. The compressed spring has a tendency to revert to its uncompressed configuration, spacing apart the central shaft and the shell.

Referring to FIGS. 5 and 6, in some embodiments, retraction and extension of the auxiliary spacer post 108 are performed in coordination with the primary spacer post, mounting the outer roller 105 surrounding the inner roller. In one example, the inner roller has a cylindrical shape, and the outer roller 105 is also maintained in a cylindrical shape by the plurality of auxiliary spacer posts 108 in coordination with the plurality of primary spacer posts.

In some embodiments, the support is a cylindrically shaped support maintained by the plurality of primary spacer posts in coordination with the plurality of auxiliary spacer posts. The retraction and extension of the primary spacer posts are the direct driving force for adjusting the diameter of the support and the spacing between the inner roller and the outer roller. By adjusting the length of the primary spacer posts, the several parameters of the anilox roll may be adjusted, including the area of the outer surface of the support, the area of the outer surface of the liquid transfer layer, the diameter of the support, the diameter of the liquid transfer layer, the area of the contacting surface between the support and the liquid transfer layer, the spacing between the inner roller and the outer roller, the volume of the liquid transfer cell, and the liquid carrying capacity of the anilox roll. On the other hand, the lengths of the auxiliary spacer posts are adjusted (e.g., by extension or retraction) to substantially the same as those of the primary spacer posts, facilitating the mounting of the outer roller surrounding the inner roller. In coordination with the primary spacer posts, the auxiliary spacer posts maintain the support in a stable shape, e.g., a cylindrical shape.

Figure 7:
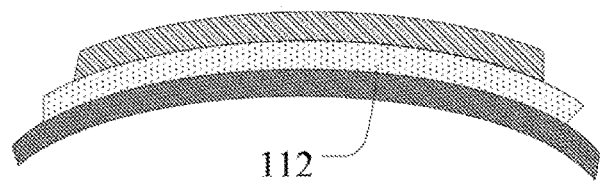
FIG. 7 is a schematic diagram illustrating the structure of a winding roller in some embodiments of the present disclosure.

In some embodiments, the outer roller has a laminated multi-layered structure having a plurality of sub-layers, at least two of the plurality of sub-layers are slidably movable relative to each other. Optionally, the outer roller is a winding roller. FIG. 7 is a schematic diagram illustrating the structure of a winding roller in some embodiments of the present disclosure. Referring to FIG. 7, the winding roller 112 in some embodiments has a laminated multi-layered structure having a plurality of sub-layers. The plurality of sub-layers may be made of various appropriate materials. Optionally, the winding roller 112 is a metal roller, and each sub-layer is made of a metal material. Optionally, the winding roller 112 is a resin roller, and each sub-layer is made of a resin material. Optionally, the winding roller 112 is a metal-resin combination roller, at least one sub-layer is made of a metal material, and at least one sub-layer is made of a resin material. Optionally, the winding roller 112 has a structure similar to the internal structure of a tape measure, having a tendency to retract inward. Optionally, the winding roller 112 includes lubricant between two adjacent sub-layers to facilitate the sliding movement of the adjacent sub-layers relative to each other. The diameter of the winder roller 112 is subject to change to a certain degree in response to external forces.

In some embodiments, the liquid transfer layer is a flexible layer. By having a flexible liquid transfer layer, the liquid transfer layer may retract and expand in response to the retraction and expansion of the support as a result of the adjustment of the spacing between the inner roller and the outer roller by the primary spacer posts. By adjusting the liquid transfer layer in a retracted configuration and an expanded configuration, the liquid transfer cells in the liquid transfer layer may be correspondingly configured to be in a retracted configuration and an expanded configuration. By retracting or expanding the liquid transfer layer, several parameters of the anilox roll may be adjusted, including the area of the outer surface of the liquid transfer layer, the diameter of the liquid transfer layer, the area of the contacting surface between the support and the liquid transfer layer, the volume of the liquid transfer cell, and consequently the liquid carrying capacity of the anilox roll. By adjusting the liquid carrying capacity of the anilox roll, various thicknesses of the alignment film coating may be achieved by using the present anilox roll.

Optionally, the liquid transfer layer is made of a resin material. Optionally, the liquid transfer layer is made of a rubber material.

Figure 8:
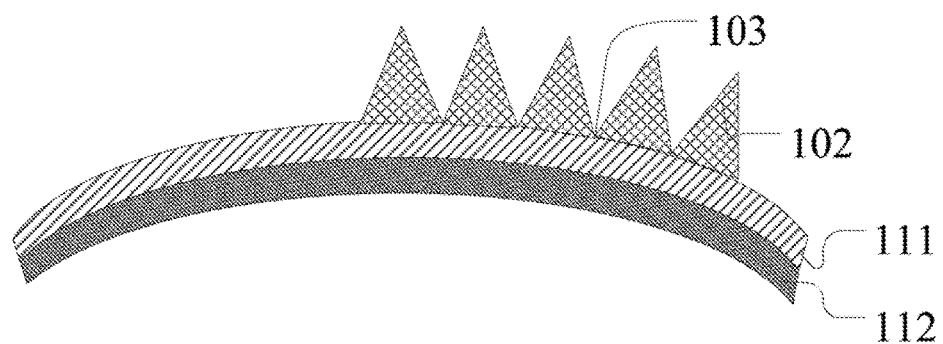
FIG. 8 is a schematic diagram illustrating the structure of a portion of the anilox roll in some embodiments of the present disclosure.

FIG. 8 is a schematic diagram illustrating the structure of a portion of the anilox roll in some embodiments of the present disclosure. Referring to FIG. 8, the anilox roll in some embodiments further includes a substrate layer 111 on a side of the liquid transfer layer 102 proximal to the outer roller. Optionally, as shown in FIG. 8, the substrate layer 111 is on a side of the liquid transfer layer 102 proximal to the winding roller 112 of the outer roller. Optionally, the substrate layer 111 is sandwiched between the winding roller 112 and the liquid transfer layer 102. Optionally, the substrate layer 111 is made of a resin material. In one example, the substrate layer 111 is made of a highly resilient, synthetic resin material. The substrate layer 111 in some embodiments functions as a stress-buffering layer.

Optionally, the substrate layer 111 is sandwiched between the winding roller 112 and the liquid transfer layer 102. The substrate layer 111 retracts and expands in response to the retraction and expansion of the winding roller 112.

Optionally, the plurality of liquid transfer cells 103 are evenly distributed over the liquid transfer layer 102. Optionally, the liquid transfer layer 102 is made of a flexible resin material. Optionally, the substrate layer 111 is made of a flexible resin material. In one example, the liquid transfer layer 102 are on a side of the substrate layer 111 distal to the winding roller 112. The liquid transfer cells 103 may have various appropriate shapes. Optionally, the cross-section of the liquid transfer cells 103 has a shape selected from a group including a circular shape, an elliptical shape, a triangular shape, a trapezoidal shape, and a fan shape.

Figure 9A:
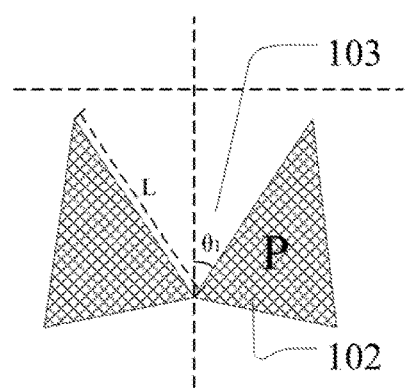
FIGS. 9A-9D are schematic diagrams illustrating the structures of a liquid transfer cell in a first configuration and a second configuration respectively in some embodiments of the present disclosure.
Figure 9B:
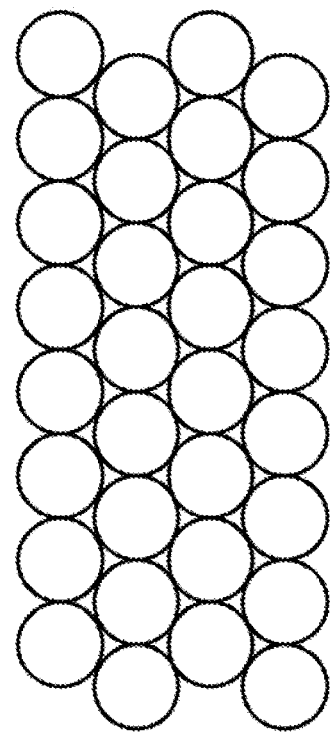

FIGS. 9A-9D are schematic diagrams illustrating the structures of a liquid transfer cell in a first configuration and a second configuration respectively in some embodiments of the present disclosure. Referring to FIG. 9A, the liquid transfer cell 103 in some embodiments has a cross-section of an isosceles triangular shape. The liquid transfer layer 102 includes a plurality of protrusions P, a cross-section of which also has an isosceles triangular shape. Each of two sides of the cross-section of the protrusion P, or each of two sides of the cross-section of the liquid transfer cell 103, has a length L. FIG. 9A illustrates a liquid transfer cell 103 in a retracted configuration, in which the two sides of the cross-section of the liquid transfer cell 103 form an included angle $2\theta_1$, wherein $\theta_1$ is an angle between one side of the cross-section of the liquid transfer cell 103 and a central axis of the liquid transfer cell 103. The area S of the cross-section can be calculated as $S=L^2 \sin\theta \cos\theta = L \sin 2\theta/2$. Thus, the larger the included angle, the larger the liquid carrying capacity of the liquid transfer cell 103. FIG. 9B is a plan view of the liquid transfer cell 103 of FIG. 9A. As shown in FIG. 9B, the liquid transfer cell 103 in some embodiments has a circular opening, e.g., the perimeter of the liquid transfer cell 103 has a circular shape. The plurality of openings of the plurality of liquid transfer cells 103 are evenly distributed throughout the liquid transfer layer.

Figure 9C:
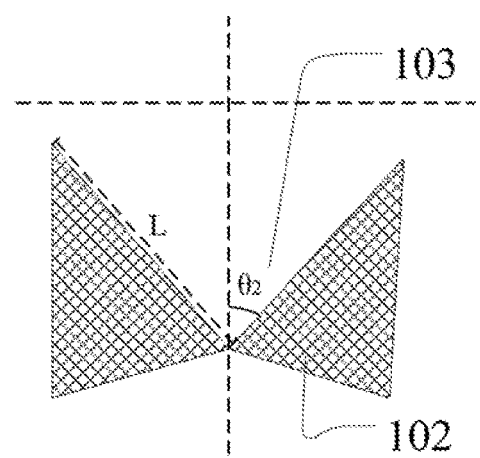
Figure 9D:
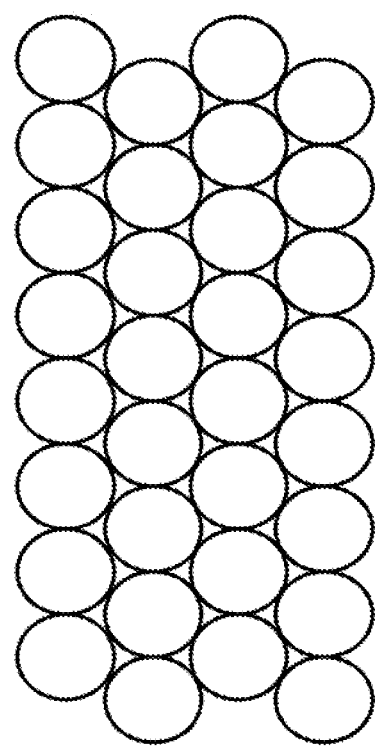

FIG. 9C illustrates a liquid transfer cell 103 in an expanded configuration, in which the two sides of the cross-section of the liquid transfer cell 103 form an included angle $2\theta_2$, wherein $\theta_2$ is an angle between one side of the cross-section of the liquid transfer cell 103 and a central axis of the liquid transfer cell 103, $\theta_1 > \theta_2$. Each of two sides of the cross-section of the protrusion P, or each of two sides of the cross-section of the liquid transfer cell 103, has a length L. The area S of the cross-section can be calculated as $S=L^2 \sin\theta \cos\theta = L \sin 2\theta/2$. Because the included angle becomes larger in the expanded configuration, the volume and the liquid carrying capacity of the liquid transfer cell 103 correspondingly increase. FIG. 9D is a plan view of the liquid transfer cells 103 of FIG. 9C. As shown in FIG. 9D, the liquid transfer cell 103 in some embodiments has an elliptical opening, e.g., the perimeter of the liquid transfer cell 103 has an elliptical shape. The plurality of openings of the plurality of liquid transfer cells 103 are evenly distributed throughout the liquid transfer layer. The major axis of the ellipse corresponds to the circumferential direction of a cylindrical shaped support. Optionally, the minor axis of the ellipse corresponds to the length direction of a cylindrical shaped support.

In some embodiments, the volume and the liquid carrying capacity of the liquid transfer cell may be adjusted by changing the spacing between the outer roller and the inner roller. In one example, the volume and the liquid carrying capacity of the liquid transfer cell are adjusted upwards. Specifically, the process includes increasing the lengths of the plurality of primary spacer posts to overcome the winding roller's tendency to retract inward, expanding the winding roller outward. As a result, the diameter of the winding roller and the diameter of the support increase, the substrate layer and the liquid transfer layer expand outward as well. Corresponding to the expanding transformation of the support, the lengths of the auxiliary spacer posts also increase in coordination with the extension of the primary spacer posts. Each auxiliary spacer post is mounted into a corresponding recess in the winding roller. The winding roller includes a plurality of recesses on its inner surface having a certain pattern, each of which corresponding to a different length of the auxiliary spacer post. By locking an auxiliary spacer post into a recess corresponding to an adjusted length of the auxiliary spacer post, the plurality of auxiliary spacer posts maintain the winding roller in a desire shape, e.g., a substantially hollow cylinder. In response to the expansion of the liquid transfer layer, the angle between an inner wall and the central axis of the liquid transfer cell increases, leading to an increased volume and liquid carrying capacity of the liquid transfer cell.

Optionally, the method includes maintaining the driver roller in a fixed position, rotating the idler roller relative to the driver roller in a clockwise fashion, and simultaneously increasing the lengths of the plurality of primary spacer posts. The rotation of the idler roller drives the rotation of the primary spacer posts connected to the idler roller. Facilitated by the simultaneous rotation and extension of the primary spacer posts, the diameter of the winding roller increases gradually, resulting in an outward expansion.

In another example, the volume and the liquid carrying capacity of the liquid transfer cell are adjusted downwards. Specifically, the process includes decreasing the lengths of the plurality of primary spacer posts to retract the winding roller inward. As a result, the diameter of the winding roller and the diameter of the support decrease, the substrate layer and the liquid transfer layer retract inward as well. Corresponding to the retracting transformation of the support, the lengths of the auxiliary spacer posts also decrease in coordination with the retraction of the primary spacer posts. Each auxiliary spacer post is mounted into a corresponding recess in the winding roller. The winding roller includes a plurality of recesses on its inner surface having a certain pattern, each of which corresponding to a different length of the auxiliary spacer post. By locking an auxiliary spacer post into a recess corresponding to a decreased length of the auxiliary spacer post, the plurality of auxiliary spacer posts maintain the winding roller in a desire shape, e.g., a substantially hollow cylinder. In response to the inward retraction of the liquid transfer layer, the angle between an inner wall and the central axis of the liquid transfer cell decreases, leading to a decreased volume and liquid carrying capacity of the liquid transfer cell.

Optionally, the method includes maintaining the driver roller in a fixed position, rotating the idler roller relative to the driver roller in a counterclockwise fashion, and simultaneously decreasing the lengths of the plurality of primary spacer posts. The rotation of the idler roller drives the rotation of the primary spacer posts connected to the idler roller. Facilitated by the simultaneous rotation and retraction of the primary spacer posts, the diameter of the winding roller decreases gradually, resulting in an inward retraction.

In another aspect, the present disclosure provides a support for assembling an anilox roll. In some embodiments, the area of the outer surface of the support is adjustable. In some embodiments, the diameter of the support is adjustable. Optionally, the support has a substantially cylindrical shape. The support can be adjusted to various configurations having different diameters or outer surface areas respectively compatible with various liquid transfer layers in order to assemble anilox rolls having different liquid carrying capacities. For example, the support can be adjusted to a retracted configuration having a relatively smaller diameter and a relatively smaller outer surface area that is complementary to a liquid transfer layer having a matching, smaller diameter. When it is desired to make a thicker alignment film, the liquid transfer layer having a matching smaller diameter can be replaced, and the support can be adjusted to an expanded configuration having a relatively larger diameter and a relatively larger outer surface that is complementary to a liquid transfer layer having a matching, larger diameter. Thus, a same support can be used in combination with several different liquid transfer layers having various liquid carrying capacities. In some embodiments, the liquid transfer layer is removably attached to the outer surface of the support.

In conventional anilox rolls, the liquid transfer layer is typically a ceramic layer coated directly onto a metal roller, and cannot be removed from the metal roller. When it is desired to make a thicker alignment film, the entire anilox roll has to be replaced with one having a greater liquid carrying capacity. As compared to the conventional anilox rolls, the present anilox roll support provides great convenience for meeting different coating requirements. When it is desired to make a thicker alignment film, a user may simply substitute the liquid transfer layer with one having greater capacity, obviating cumbersome procedures associated with the conventional anilox rolls, such as precision calibration of the anilox roll and fine tuning. Moreover, in some embodiments, the liquid transfer layer may be one made of a relatively inflexible material as each liquid transfer layer has a preset liquid carrying capacity. Optionally, each liquid transfer layer has a different, preset liquid transfer cell size or cell depth. Optionally, each liquid transfer layer has a different, preset contacting surface with the support.

In another aspect, the present disclosure provides a method of changing liquid transfer layer in an anilox roll. Optionally, the method includes first changing the diameter of the support to a value complementary to the diameter of the liquid transfer layer to be used, followed by assembling the liquid transfer layer onto the outer surface of the support. Optionally, the method includes first assembling a selected liquid transfer layer onto the outer surface of the support, followed by changing the diameter of the support to a value complementary to the diameter of the selected liquid transfer layer.

In one example, a liquid transfer layer having a greater liquid carrying capacity is selected. The method includes increasing the lengths of the plurality of primary spacer posts to overcome the winding roller's tendency to retract inward, expanding the winding roller outward. As a result, the diameter of the winding roller and the diameter of the support increase, the substrate layer expands outward as well. Corresponding to the expanding transformation of the support, the lengths of the auxiliary spacer posts also increase in coordination with the extension of the primary spacer posts. Each auxiliary spacer post is mounted into a corresponding recess in the winding roller. The winding roller includes a plurality of recesses on its inner surface having a certain pattern, each of which corresponding to a different length of the auxiliary spacer post. By locking an auxiliary spacer post into a recess corresponding to an adjusted length of the auxiliary spacer post, the plurality of auxiliary spacer posts maintain the winding roller in a desire shape, e.g., a substantially hollow cylinder. The method then further includes assembling a selected liquid transfer layer onto the outer surface of the support. The selected liquid transfer layer has a greater liquid carrying capacity, having a diameter and contacting surface matching with that of the support.

Optionally, the method includes maintaining the driver roller in a fixed position, rotating the idler roller relative to the driver roller in a clockwise fashion, and simultaneously increasing the lengths of the plurality of primary spacer posts. The rotation of the idler roller drives the rotation of the primary spacer posts connected to the idler roller. Facilitated by the simultaneous rotation and extension of the primary spacer posts, the diameter of the winding roller increases gradually, resulting in an outward expansion.

In another example, a liquid transfer layer having a smaller liquid carrying capacity is selected. The method includes decreasing the lengths of the plurality of primary spacer posts to retract the winding roller inward. As a result, the diameter of the winding roller and the diameter of the support decrease, the substrate layer retracts inward as well. Corresponding to the retracting transformation of the support, the lengths of the auxiliary spacer posts also decrease in coordination with the retraction of the primary spacer posts. Each auxiliary spacer post is mounted into a corresponding recess in the winding roller. The winding roller includes a plurality of recesses on its inner surface having a certain pattern, each of which corresponding to a different length of the auxiliary spacer post. By locking an auxiliary spacer post into a recess corresponding to a decreased length of the auxiliary spacer post, the plurality of auxiliary spacer posts maintain the winding roller in a desire shape, e.g., a substantially hollow cylinder. The method then further includes assembling a selected liquid transfer layer onto the outer surface of the support. The selected liquid transfer layer has a smaller liquid carrying capacity, having a diameter and contacting surface matching with that of the support.

Optionally, the method includes maintaining the driver roller in a fixed position, rotating the idler roller relative to the driver roller in a counterclockwise fashion, and simultaneously decreasing the lengths of the plurality of primary spacer posts. The rotation of the idler roller drives the rotation of the primary spacer posts connected to the idler roller. Facilitated by the simultaneous rotation and retraction of the primary spacer posts, the diameter of the winding roller decreases gradually, resulting in an inward retraction.

The anilox rolls described herein are configured to transfer a film of functional material (e.g., an alignment film solution) onto a transfer-receiving object (e.g., a substrate). The liquid transfer layer carries the functional material, and the anilox roll is driven to rotate so that the functional material is in continuously contact with the transfer-receiving object. The present anilox roll is capable of applying the functional material to form an ultra-thin film on the transfer-receiving object without any damage.

In another aspect, the present disclosure provides a printing method for coating an alignment solution on a substrate. In some embodiments, the method includes coating the alignment solution on the substrate using an anilox roll described herein. Optionally, the method further includes adjusting the liquid carrying capacity of the liquid transfer layer to a value suitable for forming an alignment film having a required thickness. In one example, the step of adjusting the liquid carrying capacity of the liquid transfer layer is performed by changing the liquid transfer layer on the support to a different liquid transfer layer having a desired liquid carrying capacity. In another example, the step of adjusting the liquid carrying capacity of the liquid transfer layer is performed by directly adjusting the liquid carrying capacity of the existing liquid transfer layer in situ. The present method obviates cumbersome procedures such as precision calibration of the anilox roll and fine tuning.

The present anilox roll and printing method provides several unique advantages over the conventional anilox roll and printing method. First, the present anilox roll and printing method are compatible with various liquid transfer layers. For a highly resilient liquid transfer layer, the liquid carrying capacity of the anilox roll can be adjusted by adjusting the outer surface area of the support to render the liquid transfer cells on the outer surface in a retracted configuration or an expanded configuration, thereby achieving a desired liquid carrying capacity. For a liquid transfer layer made of a less flexible material, the liquid carrying capacity of the anilox roll can be adjusted by adjusting the outer surface area of the support, and selecting and assembling a liquid transfer layer having a desired liquid carrying capacity onto the outer surface of the support. Second, the present anilox roll and printing method make it possible to adjust the thickness and evenness of the alignment film formed on a substrate, and also make it possible to fabricate different substrate products having different alignment film thickness requirements on a same anilox roll, obviating the need of switching the entire anilox roll. The manufacturing efficiency is enhanced, and manufacturing costs saved.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An anilox roll having a liquid carrying capacity, comprising:
    a support; and
    a liquid transfer layer on an outer surface of the support, the liquid transfer layer comprising a plurality of liquid transfer cells for carrying a liquid;
    wherein the liquid carrying capacity of the anilox roll is adjustable;
    wherein an area of the outer surface of the support is adjustable, the area of the outer surface being correlated to the liquid carrying capacity of the anilox roll;
    wherein the support comprises: an inner roller, an outer roller mounted surrounding the outer roller, and a plurality of spacer posts for mounting the outer roller to the inner roller, and configured to adjust a spacing between the inner roller and the outer roller, thereby adjusting the area of the outer surface of the support; and
    wherein each of the plurality of spacer posts having one terminal coupled to the inner roller and another terminal coupled to the outer roller.

2. The anilox roll of claim 1, wherein an area of a contacting surface between the support and the liquid transfer layer is adjustable; the area of the contacting surface being correlated to the liquid carrying capacity of the anilox roll.

3. The anilox roll of claim 1, wherein the support has a substantially cylindrical shape.

4. The anilox roll of claim 1, wherein the liquid transfer layer has a substantially arcuate shape.

5. The anilox roll of claim 1, wherein a liquid carrying capacity of each of the plurality of liquid transfer cells is adjustable.

6. The anilox roll of claim 1, wherein a length of each of the plurality of spacer posts is adjustable, whereby the spacing between the inner roller and the outer roller is adjusted.

7. The anilox roll of claim 1, wherein each of the plurality of spacer posts comprises a first section and a second section coupled to each other and configured to be adjustably movable relative to each other;
    a first terminal of the first section is coupled to the outer roller, a first terminal of the second section is coupled to the inner roller; and
    a second terminal of the first section and a second terminal of the second portion are adjustably movably attached to each other.

8. The anilox roll of claim 7, wherein the second terminal of the first section and the second terminal of the second section form a shell-shaft structure comprising a central shaft coupled with a shell surrounding the central shaft; and
    the central shaft is configured to move relative to the shell between an extended position and a retracted position.

9. The anilox roll of claim 7, wherein at least one of the plurality of spacer posts are a plurality of auxiliary spacer posts; the outer roller comprises a plurality of mounting recesses for mounting the plurality of auxiliary spacer posts in the plurality of mounting recesses respectively; the first terminal of the first section of each of the plurality of auxiliary spacer posts is configured to be adjustably coupled to the outer roller; and
    a protruding end of the first terminal of the first section of each of the plurality of auxiliary spacer posts is configured to extends into one of the plurality of the mounting recesses in the outer roller.

10. The anilox roll of claim 1, wherein the outer roller has a laminated multi-layered structure comprising a plurality of sub-layers, at least two of the plurality of sub-layers are slidably movable relative to each other.

11. The anilox roll of claim 1, wherein the liquid transfer layer is a flexible layer.

12. The anilox roll of claim 11, wherein the liquid transfer layer is made of a resin material or a rubber material.

13. The anilox roll of claim 1, further comprising a substrate layer on a side of the liquid transfer layer proximal to the outer roller.

14. The anilox roll of claim 13, wherein the substrate layer is made of a resin material.

15. The anilox roll of claim 1, wherein the plurality of liquid transfer cells are evenly distributed over the liquid transfer layer.

16. The anilox roll of claim 15, wherein a cross-section of one of the plurality of liquid transfer cells has a circular shape, an elliptical shape, a triangular shape, a trapezoidal shape, or a fan shape.

17. The anilox roll of claim 1, wherein the inner roller comprises a driver roller and an idler roller surrounding the driver roller; and each of the plurality of spacer posts having one terminal connected to the idler roller.

18. A support for assembling an anilox roll, comprising:
an inner roller;
an outer roller mounted surrounding the inner roller; and
a plurality of spacer posts for mounting the outer roller to the inner roller, and configured to adjust a spacing between the inner roller and the outer roller, thereby adjusting the area of an outer surface of the support;
wherein each of the plurality of spacer posts having one terminal coupled to the inner roller and another terminal coupled to the outer roller;
wherein the outer surface of the support includes a liquid transfer layer, the liquid transfer layer comprising a plurality of liquid transfer cells for carrying a liquid;
wherein an area of the outer surface of the support is adjustable; the area of the outer surface being correlated to a liquid carrying capacity of the anilox roll; and
wherein the area of the outer surface of the support is adjustable based on the spacing between outer roller to the inner roller.

* * * * *